(12) United States Patent
Boll

(10) Patent No.: US 7,793,380 B2
(45) Date of Patent: Sep. 14, 2010

(54) EXTERIOR REARVIEW MIRROR FOR A MOTOR VEHICLE

(75) Inventor: Wolf Boll, Weinstadt (DE)

(73) Assignee: Daimler AG, Stuttgart (DE)

( * ) Notice: Subject to any disclaimer, the term of this patent is extended or adjusted under 35 U.S.C. 154(b) by 487 days.

(21) Appl. No.: 10/579,237

(22) PCT Filed: Oct. 28, 2004

(86) PCT No.: PCT/EP2004/012204

§ 371 (c)(1),
(2), (4) Date: Nov. 24, 2008

(87) PCT Pub. No.: WO2005/047060

PCT Pub. Date: May 26, 2005

(65) Prior Publication Data

US 2009/0067050 A1    Mar. 12, 2009

(30) Foreign Application Priority Data

Nov. 13, 2003  (DE) ................................ 103 53 022

(51) Int. Cl.
*B60S 1/24* (2006.01)
*B60S 1/56* (2006.01)

(52) U.S. Cl. .............................. 15/250.003; 15/250.29; 15/250.23; 15/250.02

(58) Field of Classification Search ............ 15/250.003, 15/250.29, 250.23, 250.21, 250.01, 250.02; 359/512

See application file for complete search history.

(56) References Cited

U.S. PATENT DOCUMENTS

| | | | |
|---|---|---|---|
| 3,618,156 A * | 11/1971 | Riggs | ...................... 15/250.29 |
| 4,763,381 A | 8/1988 | Williams | |
| 5,760,956 A | 6/1998 | Maccan | |
| 6,032,323 A | 3/2000 | Smith et al. | |
| 6,343,402 B1 | 2/2002 | Smith et al. | |

FOREIGN PATENT DOCUMENTS

| | | |
|---|---|---|
| DE | 32 11 794 C2 | 10/1982 |
| DE | 199 00 408 A1 | 7/2000 |
| DE | 199 38 028 A1 | 3/2001 |

OTHER PUBLICATIONS

International Search Report dated Apr. 1, 2005 including English Translation of relevant portion (Four (4) pages).

* cited by examiner

*Primary Examiner*—Gary K Graham
(74) *Attorney, Agent, or Firm*—Crowell & Moring LLP

(57) ABSTRACT

An exterior rearview mirror for a motor vehicle has a mirror housing, a wiper motor, and a wiper arm which is driven by the wiper motor via a wiper mechanism and bears a wiper blade for cleaning a mirror surface. The wiper mechanism generates an essentially parallel reciprocating movement of the wiper blade. It is essential here to the invention that the wiper mechanism has a first L-shaped pivot arm and a second L-shaped pivot arm which are respectively mounted rotatably in a fixed position at their elbows and are mounted rotatably, at their limbs on the wiper side, on an inner parallel wiper arm. Furthermore, an outer parallel wiper arm which is connected to the inner parallel wiper arm and bears the wiper blade is arranged on the inner parallel wiper arm. The two pivot arms are driven by the wiper motor to which they are connected in terms of drive at their limbs on the drive side.

20 Claims, 2 Drawing Sheets

EXTERIOR REARVIEW MIRROR FOR A MOTOR VEHICLE

BACKGROUND AND SUMMARY OF THE INVENTION

The present invention relates to an exterior rearview mirror for a motor vehicle.

German document DE 199 38 028 A1 discloses an exterior rearview mirror for a motor vehicle with a mirror housing and a wiper motor. To clean a mirror surface of the exterior rearview mirror, a wiper arm is provided which is driven by the wiper motor via a wiper mechanism and bears a wiper blade. In this case, the wiper mechanism is designed in such a manner that the wiper blade executes an essentially parallel reciprocating movement. By means of the wiper technique described, the known exterior rearview mirror makes it possible to remove moisture and dirt from the mirror surface and therefore ensures a consistently good view through the exterior rearview mirror to regions situated behind the motor vehicle.

German document DE 32 11 794 C2 discloses a further exterior rearview mirror for motor vehicles. This exterior rearview mirror is suitable in particular for trucks and enables the driver to have an optimum view of the events behind him. In this case, the mirror housing can be kept small by virtue of a compact design. In addition, the exterior rearview mirror can be equipped with a wiper system for the glass, with just a single motor being required in order to pivot the mirror housing or the mirror glass to and fro between the normal position and a position widening the field of view or to clean the mirror glass with the wiper. The mirror wiping system has a straight wiper blade which is coupled to a parallelogram-type articulated lever system. In this case, the parallelogram-type articulated lever system permits a parallel wiping movement of the wiper blade and therefore good cleaning of moisture and dirt from the mirror surface.

German document DE 199 00 408 A1 discloses a further exterior mirror for a vehicle. The exterior mirror is provided with a wiping and washing system comprising a wiper motor and a wiper arm to which a wiper blade and spray nozzles are fastened. In this case, the wiper motor is arranged either above the upper, lower or laterally right or left region of the exterior mirror. It is possible to retrofit the wiping and washing system as an additional part to existing systems. The operating elements for operating the wiping and washing system are either coupled to the operating elements of an existing window wiping and washing system or are connected separately. This relates both to the supply of electric power from the vehicle electric system and for the supplying of washing water from a storage container which is already present or is to be fitted separately. Furthermore, the wiper arm is provided with a joint, with the size of the exterior mirror being taken into account. However, the wiping movement executed by the wiper arm or the wiper blade is a rotary pivoting movement and not a parallel movement.

The present invention is concerned with the problem of providing, for an exterior rearview mirror of the type mentioned at the beginning, an improved embodiment which, in particular, has a particularly compact design and, furthermore, has high resistance to soiling and icing.

This problem is solved according to the invention by the subject matter of the independent claim. Advantageous embodiments are the subject matter of the dependent claims.

According to the invention, in the case of an exterior rearview mirror for a motor vehicle with a mirror housing and a wiper motor, and a wiper arm which is driven by the wiper motor via a wiper mechanism, a rotary joint mechanism which is integrated in the wiper housing is used as a wiper mechanism.

For this purpose, the wiper mechanism of the parallel wiper according to the invention has a first L-shaped pivot arm and a second L-shaped pivot arm which are respectively mounted rotatably, for example on the mirror housing, in a fixed position at their elbows. Both pivot arms are respectively mounted rotatably at the elbow-remote end of the their limb on the wiper side on an inner parallel wiper arm and are connected to each other via the latter. An outer parallel wiper arm which bears the wiper blade is arranged on the inner parallel wiper arm, in particular via a spring joint. On the drive side, the pivot arms are connected to the wiper motor at their limbs on the drive side.

The invention therefore makes it possible in a simple manner to realize a wiper arrangement which is relatively insensitive to soiling or icing and, furthermore, permits a particularly small construction width or construction depth. For this purpose, the two pivot arms are arranged lying one above the other parallel to the inner parallel wiper arm and are connected on the drive side to the wiper motor, for example via a pendulum rod, and are mounted on the driven side in an articulated manner on the inner parallel wiper arm.

According to a preferred embodiment, a spring joint is arranged between the inner and the outer parallel wiper arm. The spring joint is designed in such a manner that it presses the wiper blade against the mirror surface. This ensures that smaller impurities, such as, for example, dirt particles, are reliably removed from the mirror surface. In addition, smearing and therefore view deterioration are avoided by the fact that the spring joint generates a defined press-on pressure on the wiper blade.

Expediently, one of the parallel wiper arms can fit around the edge of the mirror surface. In this way, nothing of the wiper mechanism can be seen from the outside, which, firstly, affords advantages in terms of design and, secondly, protects the wiper mechanism against soiling and to a certain extent also against icing. When not in use, the wiper blade advantageously rests against the edge of the mirror surface, so that a maximum mirror surface is available for observing the space at the rear.

According to an advantageous development, the wiper mechanism is fastened to a support which at the same time bears the mirror surface. This ensures that a position of the wiper blade relative to the mirror surface cannot be changed even when the mirror is adjusted, and therefore a consistently high wiping quality can be obtained.

According to a further embodiment of the invention, the exterior rearview mirror has a washing device. A washing device of this type which, for example, is heated makes it possible to reliably clean a soiled mirror surface and thereby increase the driving safety. In this connection, it is conceivable to design a washing device in such a manner that it only sprays washing liquid onto the mirror surface in the direction of movement in front of the wiper blade. In this way, the dirt adhering to the mirror surface can first of all be moistened and subsequently removed by the wiper blade. At the same time, this ensures that, after the wiping operation is ended, washing liquid no longer remains on the mirror surface and, as a result, after the wiping and washing system is switched off, a cleaned and wiped mirror surface is always present.

Further important features and advantages of the invention emerge from the subclaims, from the drawings and from the associated description of the figures with reference to the drawings.

The features mentioned above and those which have yet to be explained below can be used not only in the respectively stated combination but also in different combinations or on their own without departing from the framework of the present invention.

Preferred exemplary embodiments of the invention are illustrated in the drawings and are explained in more detail in the description below, with identical reference numbers referring to identical or functionally identical or similar components.

DETAILED DESCRIPTION OF THE INVENTION

Figures 1, 2:
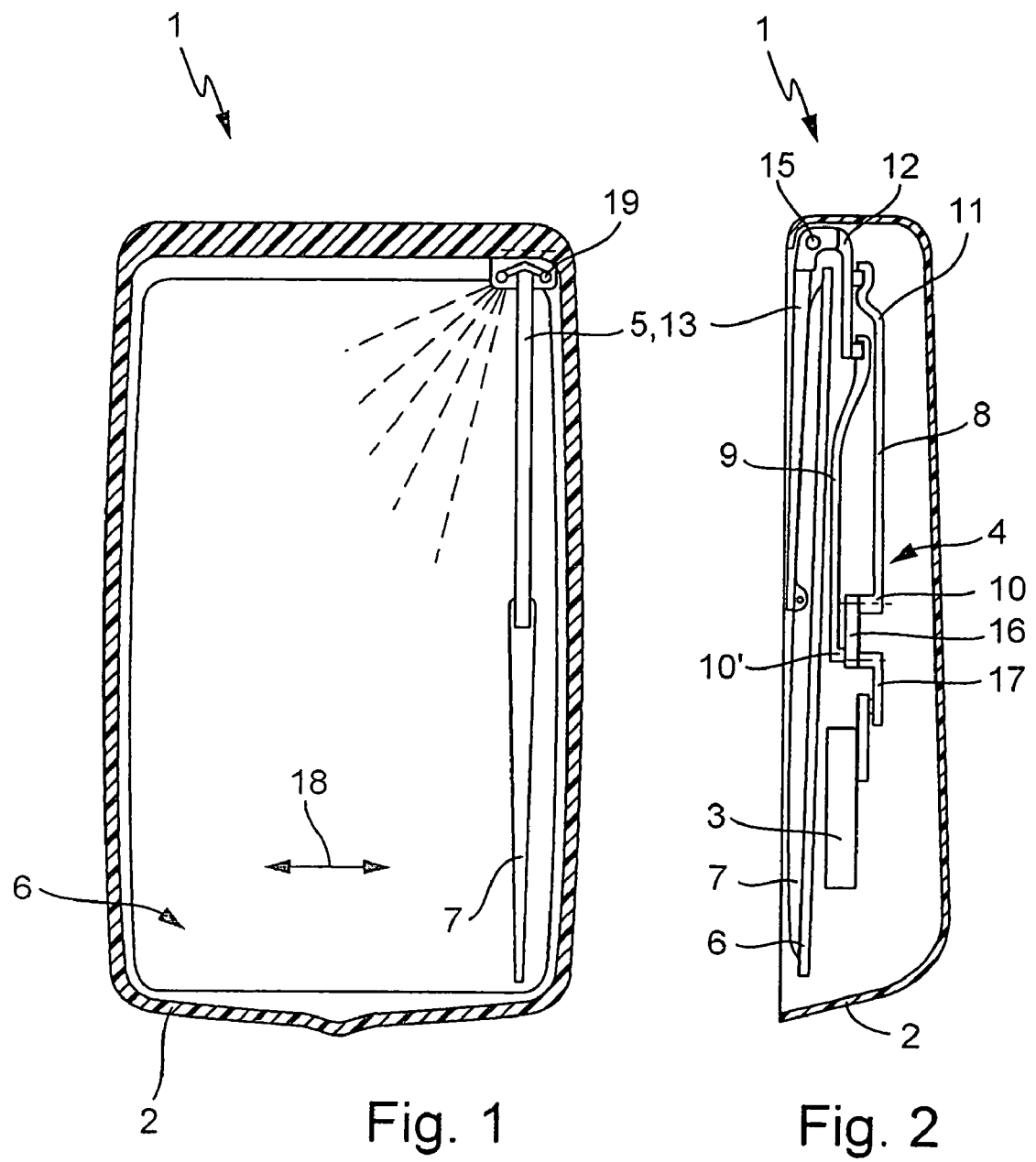
FIG. 1 shows a view of an exterior rearview mirror according to the invention.
FIG. 2 shows a longitudinal section through the exterior rearview mirror with internal wiper mechanism.

According to FIG. 1, an exterior rearview mirror 1 for a motor vehicle, in particular for a commercial vehicle, has a mirror housing 2 and a wiper arm 5 driven along a wiping direction 18. The wiper arm 5 bears a wiper blade 7 for cleaning a mirror surface 6.

Figure 3:
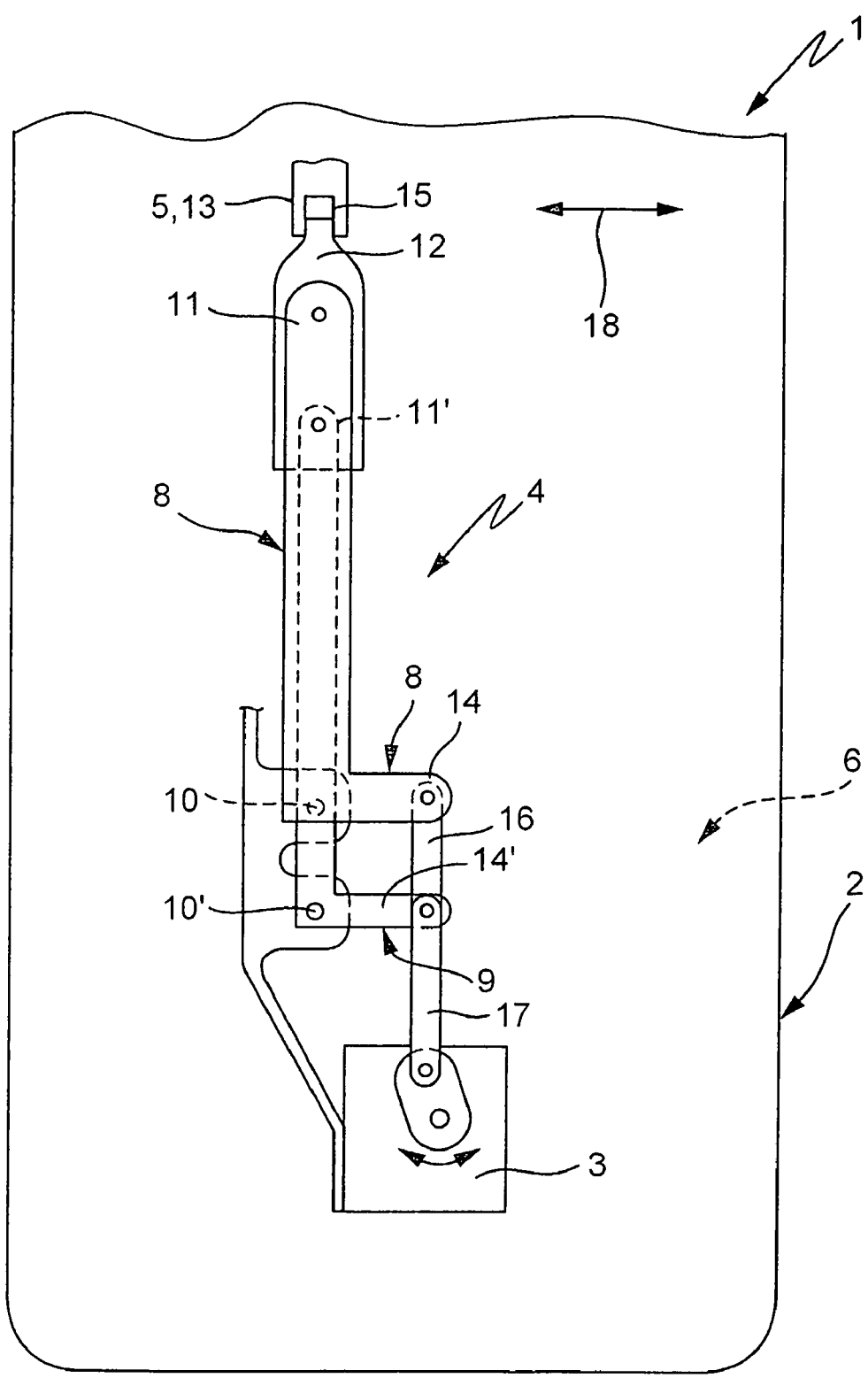
FIG. 3 shows a detailed view of the wiper mechanism according to the invention.

The wiping movement along the wiping direction 18 is achieved via a wiper mechanism 4 (cf. FIGS. 2 and 3) which is driven on the input side by a wiper motor 3, likewise shown in FIG. 2 and FIG. 3. In this case, the wiper mechanism 4 is designed in such a manner that it generates essentially parallel reciprocating movements of the wiper blade 7 along the wiping direction 18.

According to FIG. 1, provision may be made for the exterior rearview mirror 1 to have a washing device which sprays washing liquid onto the mirror surface 6 via a washing nozzle 19. In this case, the washing device advantageously has two washing nozzles 19 or a two-part washing nozzle 19 which in each case only sprays washing liquid onto the mirror surface 6 in the direction of movement in front of the wiper blade 7, so that, after the wiper motor 3 is switched off, a consistently cleaned and wiped mirror surface 6 remains behind.

Furthermore, it is conceivable that the exterior rearview mirror 1 is designed such that it can be adjusted electrically and/or heated electrically. In this case, electric adjustability increases the operating convenience and at the same time the driving safety by means of the exterior rearview mirror 1, which can be set in a simple manner and is therefore always correctly set. Furthermore, heated exterior rearview mirrors 1 permit, even in the winter months, a consistently clear mirror surface 6 and a smooth-running wiper mechanism 4 which is not impaired by icing.

According to FIGS. 2 and 3, the wiper mechanism 4 has a first L-shaped pivot arm 8 and a second L-shaped pivot arm 9 which are respectively mounted rotatably in a fixed position at their elbow 10 or 10'. Both the first pivot arm 8 and the second pivot arm 9 are mounted rotatably, at their limb 11, 11' on the wiper side, on an inner parallel wiper arm 12. A simultaneous rotation of the two pivot arms 8 and 9 about their rotary mounting at the respective elbow 10 and 10' therefore results in a pivoting of the respective limbs 11 and 11' on the wiper side and therefore in a parallel pivoting of the inner parallel wiper arm 12 along the wiping direction 18. At an end of the inner parallel wiper arm 12 that is remote from the limbs 11 and 11', an outer parallel wiper arm 13 (FIG. 2) is arranged thereon, said parallel wiper arm 13 bearing the wiper blade 7 and constituting an externally visible part of the wiping and washing system of the exterior rearview mirror 1.

A spring joint 15 is arranged between the inner parallel wiper arm 12 and the outer parallel wiper arm 13, according to FIG. 2, said spring joint firstly permitting the outer parallel wiper arm 13 to be folded down and secondly pressing the wiper blade 7 against the mirror surface 6 and therefore generating a consistently high wiping contact. In the folded-down state, the wiper blade 7 can easily be exchanged in a similar manner as in the case of conventional window wipers. In the folded-up state, the inner parallel wiper arm 12 and the outer parallel wiper arm 13 form a U-shaped fitting around an edge (not designated specifically) of the mirror surface 6.

On the drive side, the two pivot arms 8 and 9 are coupled, according to FIG. 3, to each other at their limbs 14 and 14' on the drive side via a coupling rod 16. At the limb 14', on the drive side, of the pivot arm 9, the latter is connected to the wiper motor 3 via a pendulum rod 17.

In this case, the wiper motor 3 can execute a continuous rotational movement or an oscillating movement and can therefore bring about an adjustment of the wiper blade 7 along the wiping direction 18. The coupling rod 16 ensures a consistently uniform movement of the two L-shaped limbs 8 and 9.

According to FIGS. 2 and 3, the two L-shaped pivot arms 8 and 9 are arranged essentially parallel and offset in terms of axis of rotation to each other. In this case, the elbow 10' of the second pivot arm 9 is displaced along the limb 11, on the wiper side, of the first pivot arm 8. The displaced arrangement of the two pivot arms 8 and 9 is based on a basic position in which the limb 11, on the wiper side, of the first pivot arm 8 is arranged essentially congruently with the limb 11', on the wiper side, of the second pivot arm 9.

In general, provision can be made for the wiper mechanism 4 to be fastened to a support which at the same time bears the mirror surface 6, so that, when the exterior rearview mirror is adjusted, the wiper mechanism 4 is adjusted at the same time. This affords the great advantage that the wiper mechanism 4 and therefore the outer parallel wiper arm 13 with the wiper blade 7 arranged thereon are mounted in a correct position with respect to the mirror surface 6. However, it is also conceivable that the wiper mechanism 4 is fastened to the mirror housing 2, and therefore, when the exterior rearview mirror 1 is adjusted, does not move with the movement of the mirror surface 6. Both in the case of the embodiment with the wiper mechanism 4 arranged on the support and with the wiper mechanism 4 arranged on the mirror housing 2, a good wiping quality is obtained, since, in the first case, the wiper blade 7 can always take up the optimum position with respect to the mirror surface 6 and, in the second case, the positional changes between wiper blade 7 and mirror surface 6 are firstly very small in the case of buses and/or commercial vehicles and secondly can be compensated for by a joint (not designated specifically) between wiper blade 7 and outer parallel wiper arm 13.

With the solution according to the invention, a compact arrangement of the wiper mechanism 4 within the mirror housing 2 is achieved in a structurally simple manner by means of a wiper mechanism 4 designed as a rotary joint mechanism, with the result that said wiper mechanism is accommodated in a manner such that it is protected against soiling and is visually unobtrusive.

In summary, the essential features of the solution according to the invention can be characterized as follows:

The invention makes provision, in the case of an exterior rearview mirror 1 with a mirror housing 2 and a wiper motor 3, to move a wiper blade 7 in an oscillating manner over the mirror surface 6, with the wiper mechanism 4 being designed as a compact rotary joint mechanism and arranged protected against soiling in the mirror housing 2, i.e. behind the mirror surface 6, and therefore not visibly. For this purpose, the wiper mechanism 4 has two L-shaped pivot arms 8 and 9 which are mounted parallel and offset in terms of axis of rotation to each other in a fixed position at their respective elbow 10 and 10'. In this case, the two pivot arms 8 and 9 are driven at their limbs 14 and 14', on the drive side, via a coupling rod 16 and a pendulum rod 17 and are mounted rotatably, at their limbs 11 and 11' on the wiper side, on an inner parallel wiper arm 12.

By means of the pivot arms 8 and 9 lying one above the other, a particularly compact design is achieved which makes it possible to arrange the wiper mechanism 4 entirely in the mirror housing 2 and therefore to arrange it in a manner protected against soiling and against rapid icing and at the same time to accommodate it in a visually unobtrusive manner.

The invention claimed is:

1. An exterior rearview mirror for a motor vehicle, comprising:
 a mirror housing,
 a wiper motor, and
 a wiper arm which is driven by the wiper motor via a wiper mechanism and bears a wiper blade for cleaning a mirror surface, the wiper mechanism generating an essentially parallel reciprocating movement of the wiper blade,
 wherein the wiper mechanism has a first L-shaped pivot arm and a second L-shaped pivot arm which are respectively mounted rotatably in a fixed position at their elbows,
 wherein the two pivot arms are mounted rotatably, at their limbs on a wiper side, on an inner parallel wiper arm,
 wherein an outer parallel wiper arm which bears the wiper blade is arranged on the inner parallel wiper arm, and
 wherein the first and second pivot arms are driven by the wiper motor at limbs on a drive side.

2. The exterior rearview mirror as claimed in claim 1, wherein the first and second L-shaped pivot arms are arranged essentially parallel and offset in terms of axis of rotation to each other in such a manner that the elbow of the second pivot arm is displaced along the limb, on the wiper side, of the first pivot arm.

3. The exterior rearview mirror as claimed in claim 2, comprising a spring joint arranged between the inner parallel wiper arm and the outer parallel wiper arm, said spring joint being designed in such a manner that it presses the wiper blade against the mirror surface.

4. The exterior rearview mirror as claimed in claim 2, wherein the first and second pivot arms are coupled to each other via a coupling rod at the limbs on the drive side, and wherein the coupling rod is connected to the wiper motor via a further pendulum rod.

5. The exterior rearview mirror as claimed in claim 2, wherein one of the parallel wiper arms fits around an edge of the mirror surface.

6. The exterior rearview mirror as claimed in claim 2, wherein the wiper mechanism is fastened to the mirror housing.

7. The exterior rearview mirror as claimed in claim 1, comprising a spring joint arranged between the inner parallel wiper arm and the outer parallel wiper arm, said spring joint being designed in such a manner that it presses the wiper blade against the mirror surface.

8. The exterior rearview mirror as claimed in claim 7, wherein the first and second pivot arms are coupled to each other via a coupling rod at the limbs on the drive side, and wherein the coupling rod is connected to the wiper motor via a further pendulum rod.

9. The exterior rearview mirror as claimed in claim 7, wherein one of the parallel wiper arms fits around an edge of the mirror surface.

10. The exterior rearview mirror as claimed in claim 7, wherein the wiper mechanism is fastened to the mirror housing.

11. The exterior rearview mirror as claimed in claim 1, wherein the first and second pivot arms are coupled to each other via a coupling rod at the limbs on the drive side, and wherein the coupling rod is connected to the wiper motor via a further pendulum rod.

12. The exterior rearview mirror as claimed in claim 11, wherein one of the parallel wiper arms fits around an edge of the mirror surface.

13. The exterior rearview mirror as claimed in claim 11, wherein the wiper mechanism is fastened to the mirror housing.

14. The exterior rearview mirror as claimed in claim 1, wherein one of the parallel wiper arms fits around an edge of the mirror surface.

15. The exterior rearview mirror as claimed in claim 1, wherein the wiper mechanism is fastened to the mirror housing.

16. The exterior rearview mirror as claimed in claim 1, wherein the wiper mechanism is fastened to a support which at the same time bears the mirror surface.

17. The exterior rearview mirror as claimed in claim 1, wherein the exterior rearview mirror is designed such that it can be adjusted electrically.

18. The exterior rearview mirror as claimed in claim 1, wherein the exterior rearview mirror is designed such that it can be heated.

19. The exterior rearview mirror as claimed in claim 1, wherein the exterior rearview mirror has a washing device.

20. The exterior rearview mirror as claimed in claim 19, wherein the washing device is designed in such a manner that it only sprays washing liquid onto the mirror surface in the direction of movement in front of the wiper blade.

* * * * *